US012512253B2

(12) United States Patent
Yoshino et al.

(10) Patent No.: US 12,512,253 B2
(45) Date of Patent: Dec. 30, 2025

(54) COIL COMPONENT

(71) Applicant: TDK Corporation, Tokyo (JP)

(72) Inventors: Hanako Yoshino, Tokyo (JP); Keigo Higashida, Tokyo (JP)

(73) Assignee: TDK Corporation, Tokyo (JP)

( * ) Notice: Subject to any disclaimer, the term of this patent is extended or adjusted under 35 U.S.C. 154(b) by 1037 days.

(21) Appl. No.: 17/190,857

(22) Filed: Mar. 3, 2021

(65) Prior Publication Data

US 2021/0280359 A1 Sep. 9, 2021

(30) Foreign Application Priority Data

Mar. 9, 2020 (JP) ................................ 2020-040164

(51) Int. Cl.

*H01F 17/04* (2006.01)
*H01F 27/24* (2006.01)
*H01F 27/28* (2006.01)
*H01F 27/29* (2006.01)

(52) U.S. Cl.

CPC ......... *H01F 27/2823* (2013.01); *H01F 17/04* (2013.01); *H01F 17/045* (2013.01); *H01F 27/24* (2013.01); *H01F 27/29* (2013.01)

(58) Field of Classification Search

CPC .... H01F 27/2823; H01F 17/045; H01F 27/29; H01F 17/04; H01F 27/24
USPC .................................................. 336/83, 192
See application file for complete search history.

(56) References Cited

U.S. PATENT DOCUMENTS

| | | | | |
|---|---|---|---|---|
| 9,715,961 | B2 * | 7/2017 | Takagi | H01F 27/2823 |
| 2014/0167903 | A1 * | 6/2014 | Tomonari | H01F 17/045 336/220 |
| 2018/0211763 | A1 * | 7/2018 | Komaya | H01F 27/2828 |
| 2018/0226181 | A1 * | 8/2018 | Aoki | H01F 41/086 |
| 2018/0308624 | A1 * | 10/2018 | Tanaka | H01F 27/26 |
| 2018/0366259 | A1 | 12/2018 | Mikogami et al. | |
| 2020/0312537 | A1 * | 10/2020 | Shiokawa | H01F 27/29 |
| 2020/0335261 | A1 * | 10/2020 | Sukegawa | H01F 41/0246 |

FOREIGN PATENT DOCUMENTS

| | | | |
|---|---|---|---|
| CN | 105720371 | A * | 6/2016 |
| CN | 108417360 | A | 8/2018 |
| CN | 108735471 | A | 11/2018 |

(Continued)

OTHER PUBLICATIONS

English translation of Chinese Office Action dated Aug. 5, 2024, from corresponding CN Application No. 202110251201.9, 10 pages.

*Primary Examiner* — Tszfung J Chan
(74) *Attorney, Agent, or Firm* — Rimon P.C.

(57) ABSTRACT

Disclosed herein is a coil component that includes a winding core part and a wire wound around the winding core part. The winding core part includes a first winding area positioned on a first flange part side, a second winding area positioned on a second flange part side, and a third winding area positioned between the first and second winding areas. The wire includes a first section wound in a plurality of turns around the first winding area, a second section wound in a plurality of turns around the second winding area, and a third section wound in less than one turn around the third winding area. A shift amount of a winding position of the wire in an axial direction per turn is larger in the third section than in each of the first and second sections.

11 Claims, 8 Drawing Sheets

(56) References Cited

FOREIGN PATENT DOCUMENTS

| | | | | |
|---|---|---|---|---|
| JP | 02156513 | A | * | 6/1990 |
| JP | 2007-115761 | A | | 5/2007 |
| JP | 2012009710 | A | * | 1/2012 |
| JP | 2013219088 | A | * | 10/2013 |
| JP | 2016213354 | A | * | 12/2016 |

* cited by examiner

COIL COMPONENT

BACKGROUND OF THE INVENTION

Field of the Invention

The present invention relates to a coil component and, more particularly, to a coil component having a drum-shaped core around which a wire is wound.

Description of Related Art

As a coil component having a drum-shaped core around which a wire is wound, a coil component described in JP 2007-115761A is known. In the coil component described in JP 2007-115761A, inductance is regulated by providing a densely wound part and a sparsely wound part in the wire.

However, in the coil component described in JP 2007-115761A, when displacement occurs in the winding position of the wire constituting the sparsely wound part, characteristics changes unexpectedly.

SUMMARY

It is therefore an object of the present invention to provide a coil component having a wire winding area with a high winding density and that with a low winding density, capable of suppressing a change in characteristic due to displacement of the winding position of the wire.

A coil component according to the present invention includes: a core having a winding core part, a first flange part positioned at one axial end of the winding core part, and a second flange part positioned at the other axial end of the winding core part; a first terminal electrode provided on the first flange part; a second terminal electrode provided on the second flange part; and a wire wound around the winding core part, having one end connected to the first terminal electrode, and having the other end connected to the second terminal electrode. The winding core part includes a first winding area positioned on the first flange part side, a second winding area positioned on the second flange part side, and a third winding area positioned between the first and second winding areas. The wire includes a first section wound in a plurality of turns around the first winding area, a second section wound in a plurality of turns around the second winding area, and a third section wound in less than one turn around the third winding area. The shift amount of the winding position of the wire in the axial direction per turn is larger in the third section than in each of the first and second sections.

According to the present invention, the third section having a low winding density is wound in less than one turn, making it less likely to cause a change in characteristics due to displacement of the wire.

In the present invention, adjacent turns of the wire may contact each other in each of the first and second sections. This makes the winding position of the wire stable in the first and second sections.

In the present invention, the third section may be wound in equal to or less than ½ turn. This makes the winding position of the wire more stable in the third section.

In the present invention, the winding core part may further include a first clearance area positioned between the first flange part and the first winding area and free from the wire and a second clearance area positioned between the second flange part and the second winding area and free from the wire, and the widths of the first and second clearance areas in the axial direction may be different from each other. Such a structure is obtained by setting one of the first and second clearance areas as the winding start side of the wire, setting the other one thereof as the winding end side, and reducing the axial width of the one of the first and second clearance areas that is set as the winding start side. In this case, the one of the first and second clearance areas may have an axial width smaller than the diameter of the wire. This can reduce the entire size of the coil component.

In the present invention, the winding core part may have a predetermined winding surface that can be viewed in a direction perpendicular to the axial direction, and the shift amount of the winding position of the wire in the third section on the predetermined winding surface may be five times or more the diameter of the wire. This reduces a capacitive component (inter-wire capacitance) between turns of the wire to thereby widen a frequency band in which an impedance having a predetermined value or more can be obtained.

In the present invention, the width of the third winding area in the axial direction may be larger than the width of at least one of the first and second winding areas in the axial direction. In this case as well, a capacitive component (inter-wire capacitance) between turns of the wire is reduced to thereby widen a frequency band in which an impedance having a predetermined value or more can be obtained.

In the present invention, the cross section of the winding core part perpendicular to the axial direction thereof may have a plurality of first corner parts and a plurality of second corner parts, the internal angle of each of the first corner parts may be smaller than that of each of the second corner parts, and both the start and end points of the third section of the wire may be positioned at the first corner parts. This makes it less likely to cause displacement of the wire.

According to the present invention, there can be provided a coil component having a wire winding area with a high winding density and that with a low winding density, capable of suppressing a change in characteristic due to displacement of the winding position of the wire.

BRIEF DESCRIPTION OF THE DRAWINGS

The above features and advantages of the present invention will be more apparent from the following description of certain preferred embodiments taken in conjunction with the accompanying drawings, in which.

DETAILED DESCRIPTION OF THE EMBODIMENTS

Preferred embodiments of the present invention will be explained below in detail with reference to the accompanying drawings.

Figure 1:
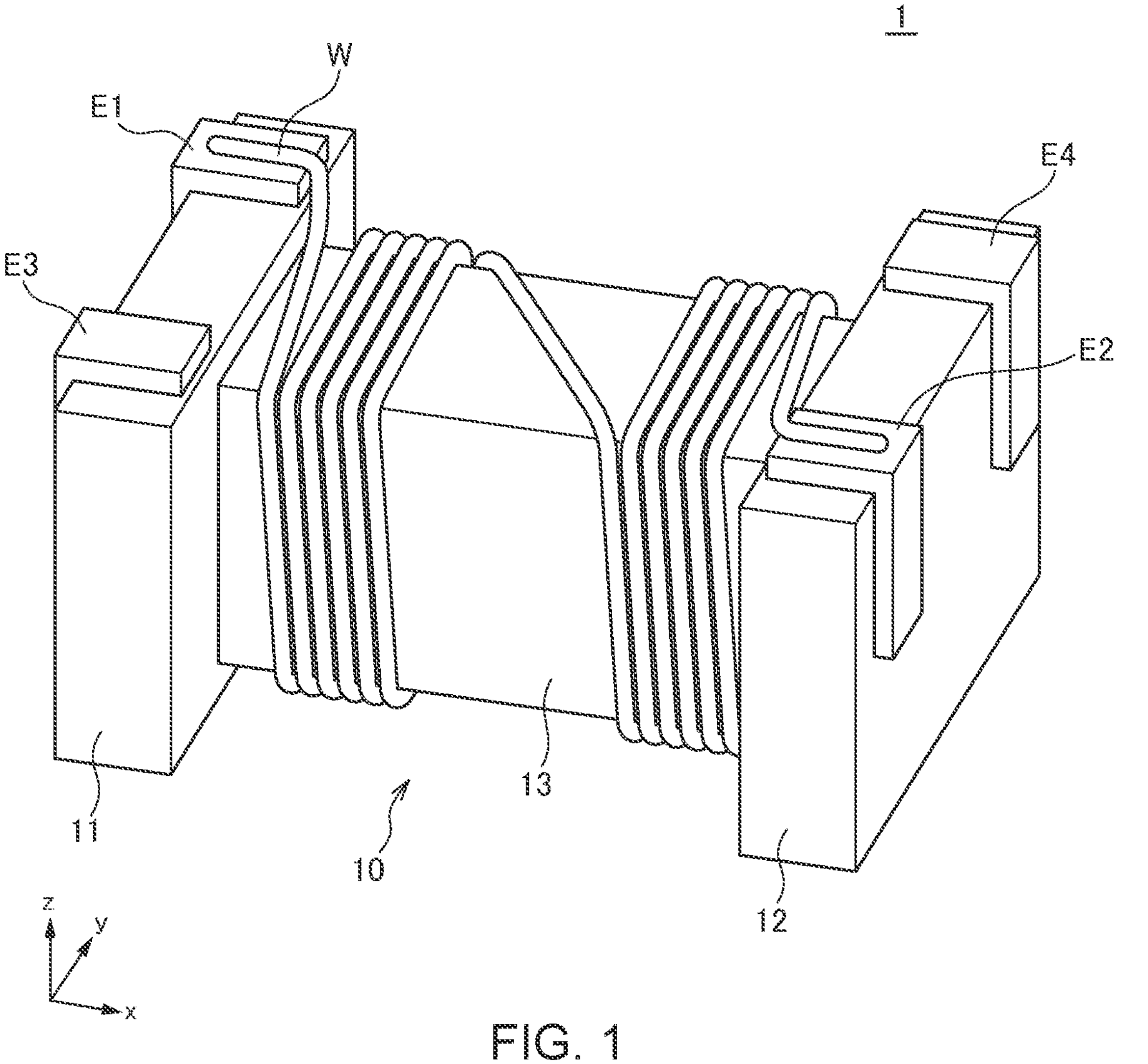
FIG. 1 is a schematic perspective view illustrating the outer appearance of a coil component 1 according to an embodiment of the present invention.

FIG. 1 is a schematic perspective view illustrating the outer appearance of a coil component 1 according to an embodiment of the present invention.

As illustrated in FIG. 1, the coil component 1 according to the embodiment has a drum-shaped core 10, terminal electrodes E1 to E4, and a wire W. The drum-shaped core 10 includes a winding core part 13 with its axis directed to the x-direction, a flange part 11 provided at one end of the winding core part 13 in the x-direction, and a flange part 12 provided at the other end of the winding core part 13 in the x-direction. As a material for the drum-shaped core 10, a high permeability magnetic material having a permeability μ of 10 H/m to 4000 H/m, such as ferrite, is preferably used.

The terminal electrodes E1 and E3 are provided on the flange part 11, and the terminal electrodes E2 and E4 are provided on the flange part 12. The terminal electrodes E1 to E4 may each be a terminal fitting or a conductive paste applied onto the surface of the flange part 11 or 12. The wire W is wound around the winding core part 13 so as to be connected at one end to the terminal electrode E1 and at the other end to the terminal electrode E2.

Figure 2A:
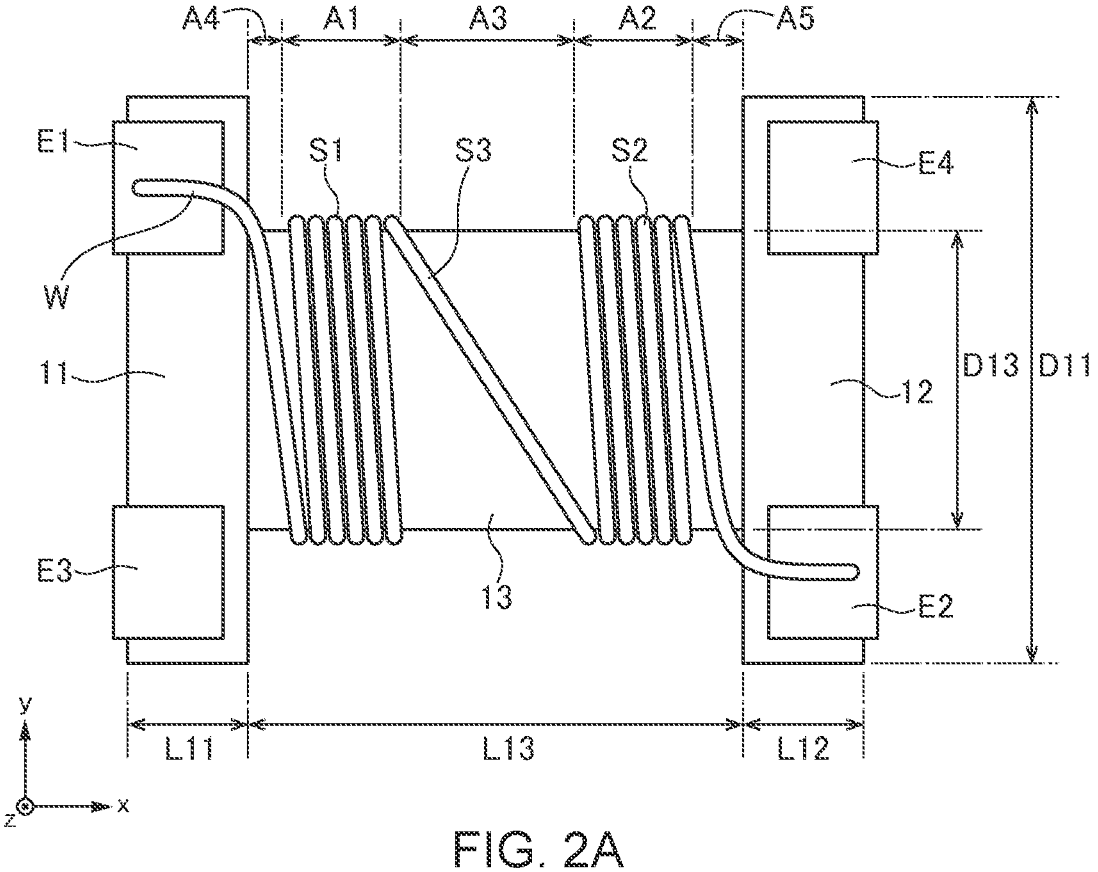
FIG. 2A is an xy plan view of the coil component 1.
Figure 2B:
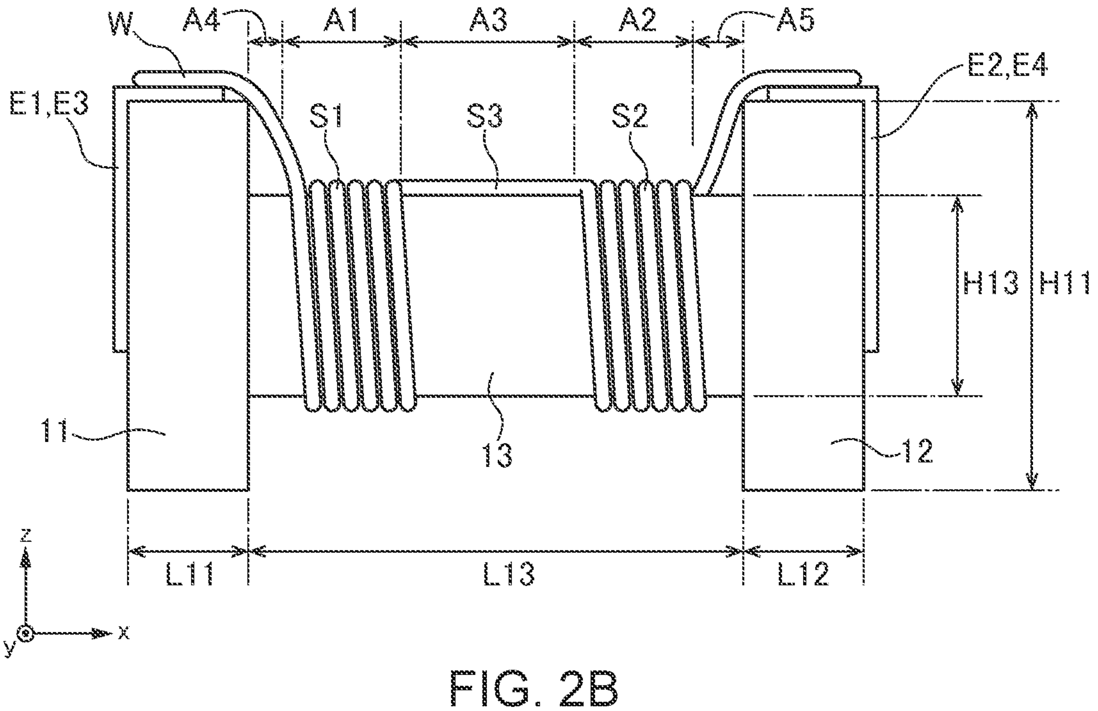
FIG. 2B is an xz plan view of the coil component 1.

FIG. 2A is an xy plan view of the coil component 1, and FIG. 2B is an xz plan view of the coil component 1.

As illustrated in FIGS. 2A and 2B, the winding core part 13 of the drum-shaped core 10 includes a winding area A1 positioned on the flange part 11 side, a winding area A2 positioned on the flange part 12 side, a winding area A3 positioned between the winding areas A1 and A2, a clearance area A4 positioned between the flange part 11 and the winding area A1, and a clearance area A5 positioned between the flange part 12 and the winding area A2. The winding areas A1 to A3 are a center area around which the wire W is wound, and the clearance areas A4 and A5 are each an end area free from the wire W.

The wire W includes sections S1 to S3 wound around the winding areas A1 to A3, respectively. The sections S1 and S2 are each a section in which the wire W is densely wound in a plurality of turns. In the sections S1 and S2, adjacent turns in the x-direction may contact each other. Thus, in this case, the x-direction shift amount of the winding position in each of the sections S1 and S2 per turn substantially coincides with the diameter of the wire W. This can make the number of turns of the wire W sufficient and can make it less likely to cause displacement of the wire in the x-direction.

On the other hand, the number of turns of the section S3 is about ¼ turns, i.e., less than one turn. Further, the section S3 does not contact the sections S1 and S2 and significantly shifts in the x-direction. In other words, the x-direction shift amount of the winding position per turn (or per unit wire length) is larger in the section S3 than in the sections S1 and S2. The number of turns in the section S1 and that in the section S2 may be the same or different.

The width of the winding area A3 in the x-direction may be larger than those of the winding areas A1 and A2 in the x-direction. When the width of the winding area A3 in the x-direction is sufficient, a capacitive component (inter-wire capacitance) between turns of the wire W is reduced, thereby widening a frequency band in which an impedance having a predetermined value or more (e.g., 1 kΩ or more) can be obtained.

The width of each of the clearance areas A4 and A5 in the x-direction may be smaller than the width of each of the winding areas A1 to A3 in the x-direction. Here, assuming that the terminal electrode E1 side of the wire W is set as the winding start side and that the terminal electrode E2 side of the wire W is as the winding end side, the clearance area A4 is positioned on the winding start side of the wire W, so that the width of the clearance area A4 in the x-direction can be sufficiently reduced. In this case, the width of the clearance area A4 in the x-direction is preferably designed smaller than the diameter of the wire W. When the width of the clearance area A4 in the x-direction is thus designed sufficiently small, it is possible to reduce the entire size and to further enlarge the width of the winding area A3 in the x-direction. On the other hand, the clearance area A5 is positioned on the winding end side of the wire W and thus needs to have a certain degree of margin. Thus, the width of the clearance area A5 in the x-direction is preferably designed larger than the width of the clearance area A4 in the x-direction.

Figure 3:
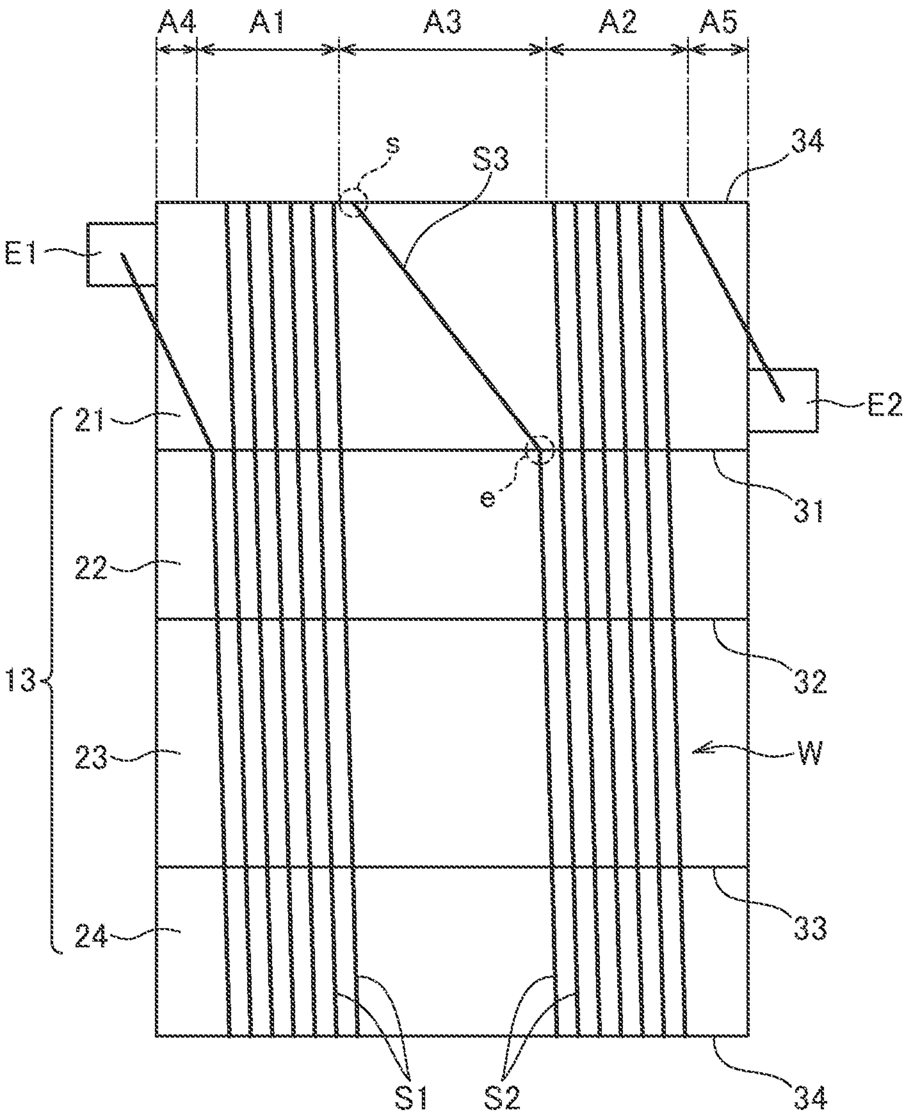
FIG. 3 is a developed view for explaining the winding pattern of the wire W in more detail.

FIG. 3 is a developed view for explaining the winding pattern of the wire W in more detail.

As illustrated in FIG. 3, the winding core part 13 has four winding surfaces 21 to 24 and four corner parts 31 to 34. The winding surfaces 21 and 23 constitute the xy plane, and the winding surfaces 22 and 24 constitute the xz plane. The corner part 31 serves as the boundary between the winding surfaces 21 and 22, the corner part 32 serves as the boundary between the winding surfaces 22 and 23, the corner part 33 serves as the boundary between the winding surfaces 23 and 24, and the corner part 34 serves as the boundary between the winding surfaces 24 and 21. In the example of FIG. 3, the section S3 of the wire W is positioned only on the winding surface 21. The x-direction shift amount of the winding position in the section S3 is preferably five times or more the diameter of the wire W. This reduces the inter-wire capacitance of the wire W to thereby widen a frequency band in which an impedance having a predetermined value or more (e.g., 1 kΩ or more) can be obtained.

Figure 4:
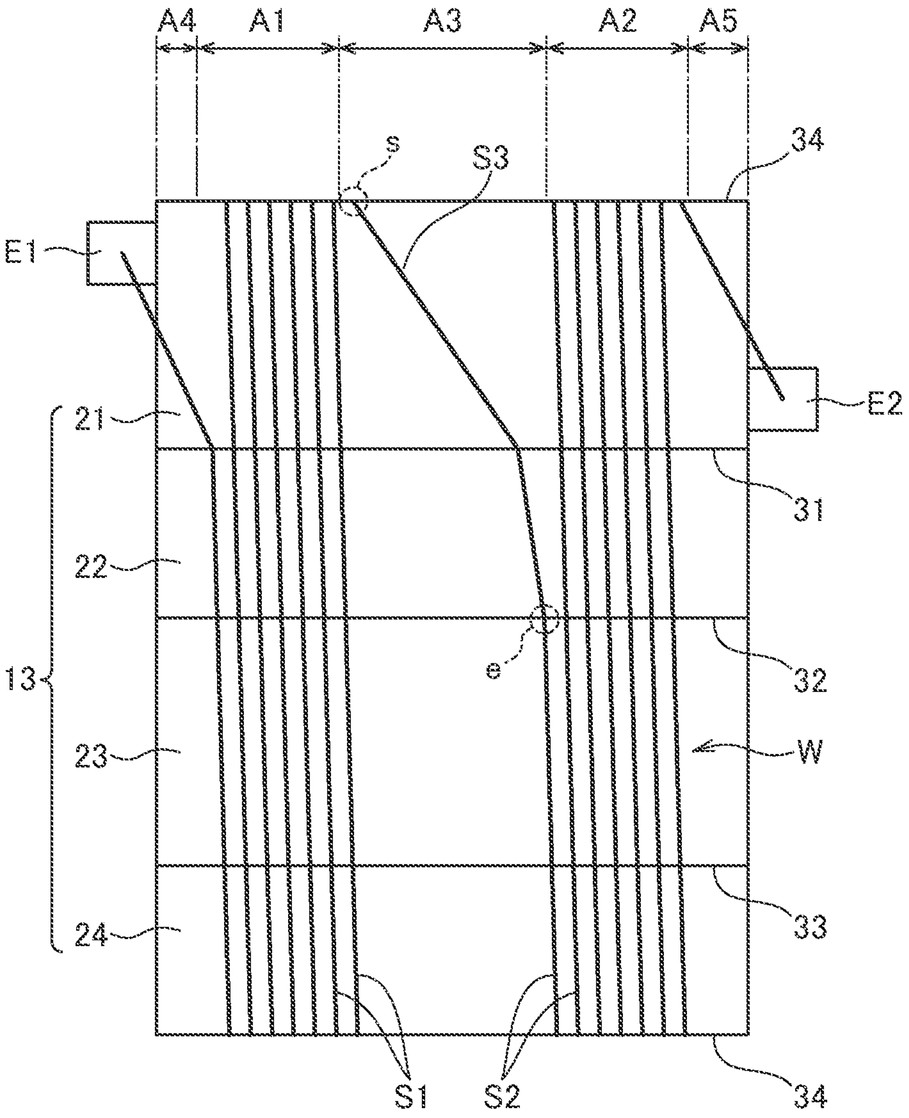
FIG. 4 is a developed view for explaining the winding pattern of the wire W according to a first modification.
Figure 5:
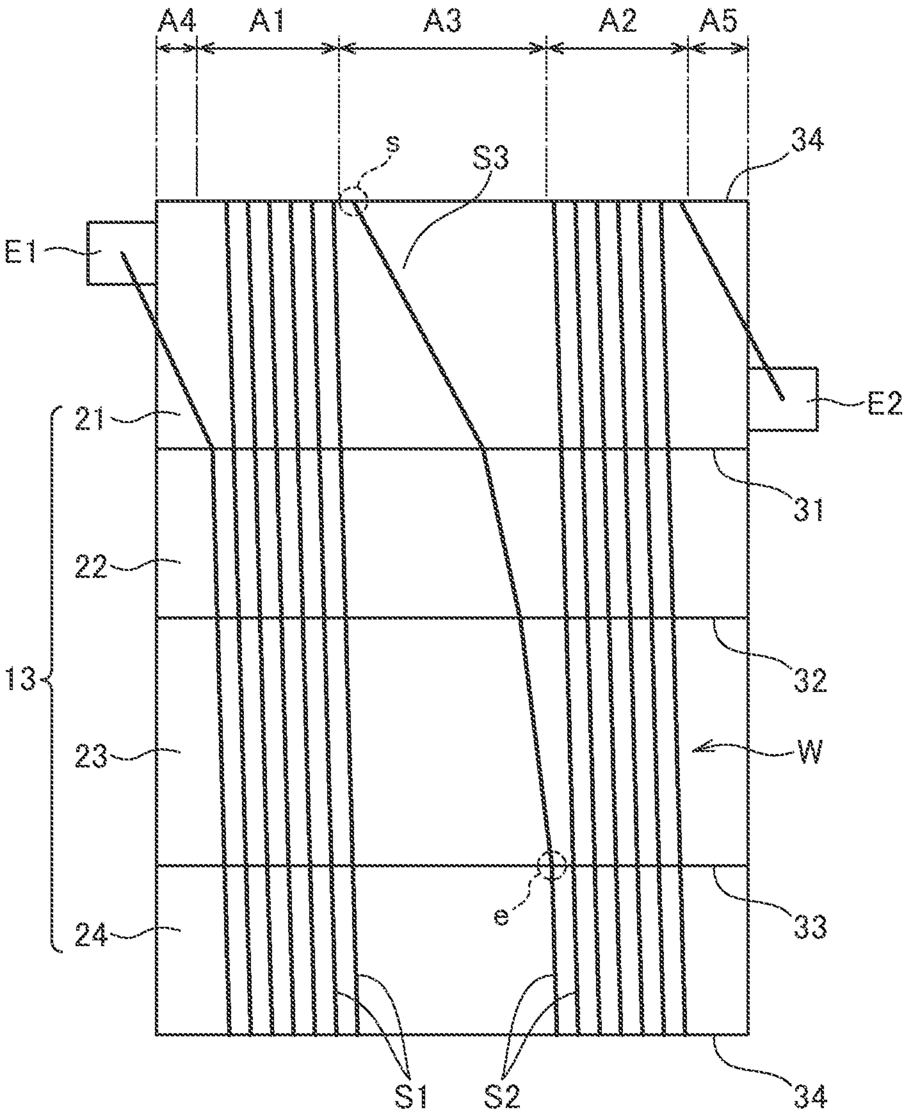
FIG. 5 is a developed view for explaining the winding pattern of the wire W according to a second modification.

When the terminal electrode E1 side of the wire W and the terminal electrode E2 side thereof are set as the winding start side and winding end side, respectively, a start point s of the section S3 of the wire W is positioned on the corner part 34, and an end point e of the section S3 is positioned on the corner part 31. The reason that the start point s and end point e of the section S3 are each positioned on the corner part is that the corner part has a positioning effect of the wire W. However, the positions of the start point s and end point e of the section S3 are not limited to these as long as the number of turns of the section S3 is less than one turn, but the end point e of the section S3 may be positioned on the corner part 32 as in a first modification of FIG. 4 or on the corner part 33 as in a second modification of FIG. 5. In the example of FIG. 4, the section S3 of the wire W is positioned on the winding surfaces 21 and 22, and the number of turns thereof is about ½. In the example of FIG. 5, the section S3 of the wire W is positioned on the winding surfaces 21 to 23, and the number of turns thereof is about ¾.

In the example of FIG. 5, the boundary between the sections S3 and S2 is the corner part 33. However, when the boundary is ambiguous, the sections S3 and S2 may be distinguished based on whether adjacent turns contact each other or not (a section in which adjacent turns do not contact each other is regarded as the section S3; a section in which adjacent turns contact each other is as the section S2) or whether a space formed between adjacent turns is equal to or larger than the diameter of the wire W or not (a section in which a space formed between adjacent turns is equal to or larger than the diameter of the wire W is regarded as the section S3; a section in which the space between adjacent turns is smaller than the diameter of the wire W is as the section S2).

Further, when the lengths of the flange part 11, flange part 12, and winding core part 13 in the x-direction are assumed to be L11, L12, and L13, respectively, as illustrated in FIGS. 2A and 2B, it is preferable to reduce the lengths L11 and L12 and to accordingly increase the length L13. This makes it possible to widen a frequency band in which an impedance having a predetermined value or more (e.g., 1 kΩ or more) can be obtained.

Further, when the width of each of the flange parts 11 and 12 in the y-direction is assumed to be D11, the width of the winding core part 13 in the y-direction is assumed to be D13, the height of each of the flange parts 11 and 12 in the z-direction is assumed to be H11, and the height of the winding core part 13 in the z-direction is assumed to be H13, as illustrated in FIGS. 2A and 2B, it is preferable to reduce the width D13 and height H13 to thereby reduce the yz cross-sectional area of the winding core part 13. In this case as well, it is possible to widen a frequency band in which an impedance having a predetermined value or more (e.g., 1 kΩ or more) can be obtained.

Figure 6A:
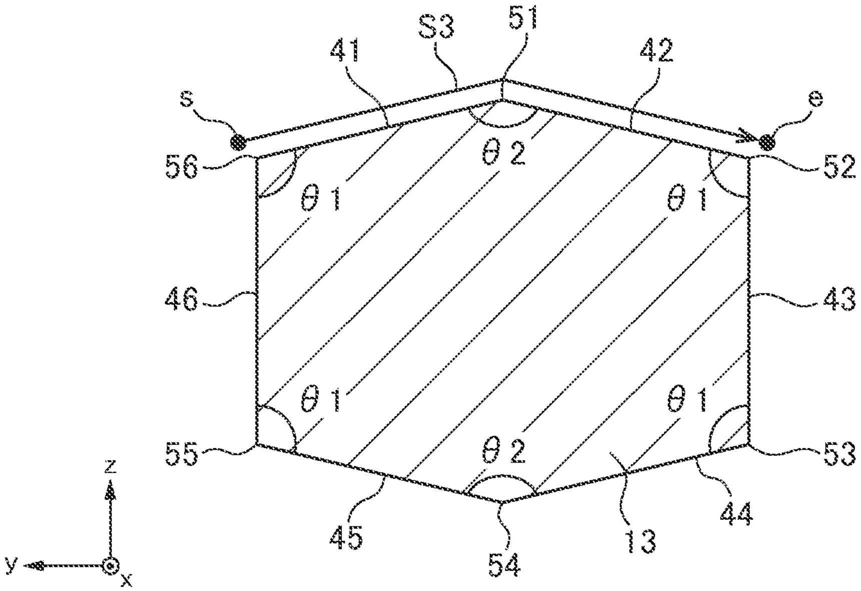
FIGS. 6A and 6B are schematic perspective views illustrating an example in which the yz cross-sectional shape of the winding core part 13 is a hexagon.
Figure 6B:
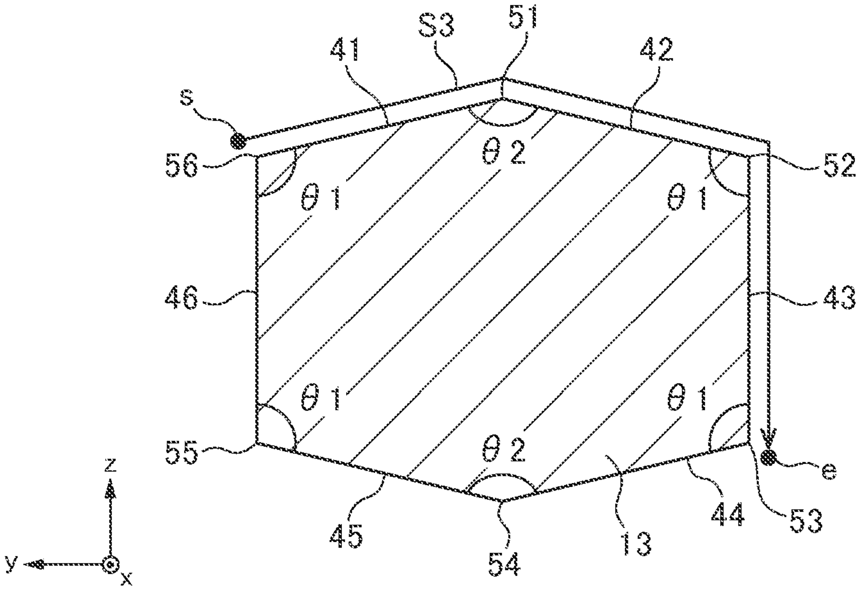
Figure 7A:
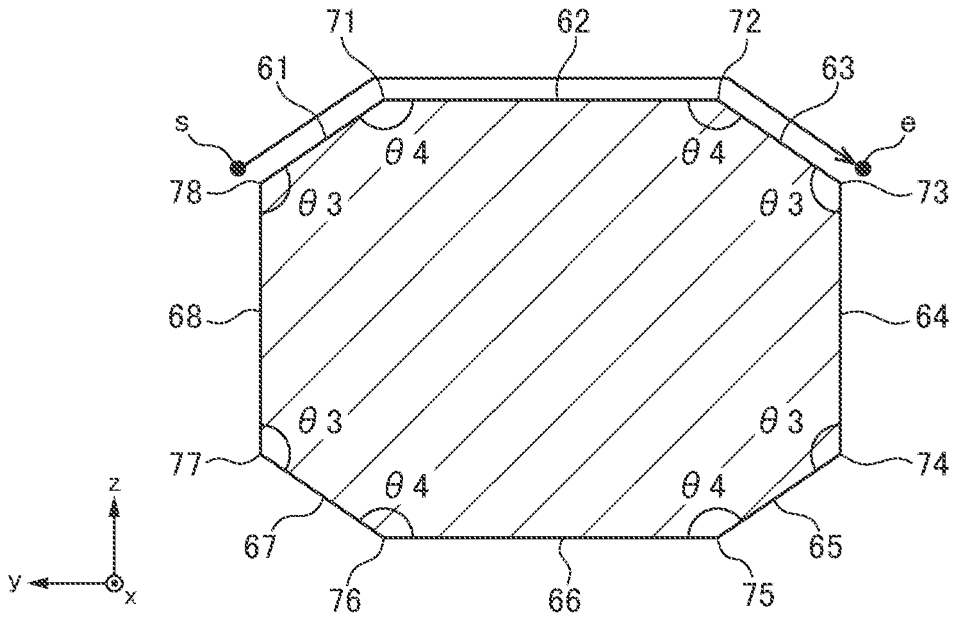
FIGS. 7A and 7B are schematic perspective views illustrating an example in which the yz cross-sectional shape of the winding core part 13 is an octagon.
Figure 7B:
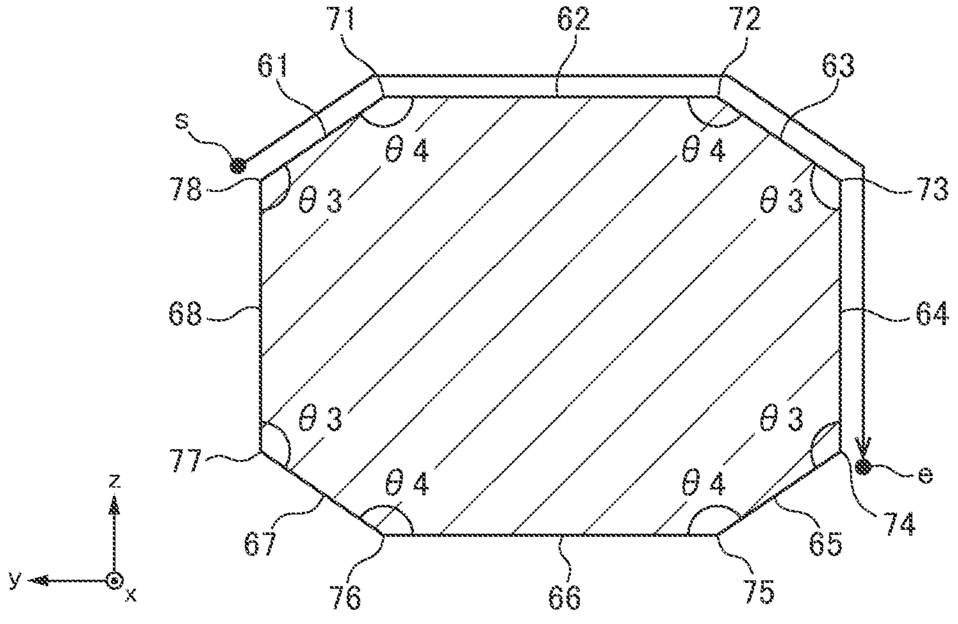

The yz cross-sectional shape of the winding core part 13 may not necessarily be a quadrangular, but may be a hexagon as illustrated in FIGS. 6A and 6B or an octagon as illustrated in FIGS. 7A and 7B.

When the yz cross-sectional shape of the winding core part 13 is a hexagon, the winding core part 13 has a winding surfaces 41 to 46 and corner parts 51 to 56, as illustrated in FIGS. 6A and 6B. When the internal angle of each of the corner parts 52, 53, 55, and 56 is assumed to be θ1, and the internal angle of each of the corner parts 51 and 54 is assumed to be θ2, θ1<θ2 is satisfied. In this case, as illustrated in FIG. 6A, the corner part 56 serving as the boundary between the winding surfaces 46 and 41 may be set as the start point s of the section S3, and the corner part 52 serving as the boundary between the winding surfaces 42 and 43 may be set as the end point e of the section S3. In this case, the number of turns of the section S3 is about ⅓. The winding surfaces 41 and 42 on which the section S3 extends can be viewed in the z-direction. Further, as illustrated in FIG. 6B, the corner part 56 serving as the boundary between the winding surfaces 46 and 41 may be set as the start point s of the section S3, and the corner part 53 serving as the boundary between the winding surfaces 43 and 44 may be set as the end point e of the section S3. In this case, the number of turns of the section S3 is about ½. As described above, when there is a difference in internal angle among the corner parts 51 to 56, it is preferable to set the corner part 52, 53, 55, or 56 having a smaller internal angle as the start point s or end point e. This is because the corner part having a smaller internal angle exhibits a larger positioning effect of the wire W.

When the yz cross-sectional shape of the winding core part 13 is an octagon, the winding core part 13 has winding surfaces 61 to 68 and corner parts 71 to 78, as illustrated in FIGS. 7A and 7B. When the internal angle of each of the corner parts 73, 74, 77, and 78 is assumed to be θ3, and the internal angle of each of the corner parts 71, 72, 75, and 76 is assumed to be θ4, θ3<θ4 is satisfied. In this case, as illustrated in FIG. 7A, the corner part 78 serving as the boundary between the winding surfaces 68 and 61 may be set as the start point s of the section S3, and the corner part 73 serving as the boundary between the winding surfaces 63 and 64 may be set as the end point e of the section S3. In this case, the number of turns of the section S3 is about ⅜. The winding surfaces 61 to 63 on which the section S3 extends can be viewed in the z-direction. Further, as illustrated in FIG. 7B, the corner part 78 serving as the boundary between the winding surfaces 68 and 61 may be set as the start point s of the section S3, and the corner part 74 serving as the boundary between the winding surfaces 64 and 65 may be set as the end point e of the section S3. In this case, the number of turns of the section S3 is about ½. In this example as well, it is preferable to set the corner part 73, 74, 77, or 78 having a smaller internal angle as the start point s or end point e.

Figure 8:
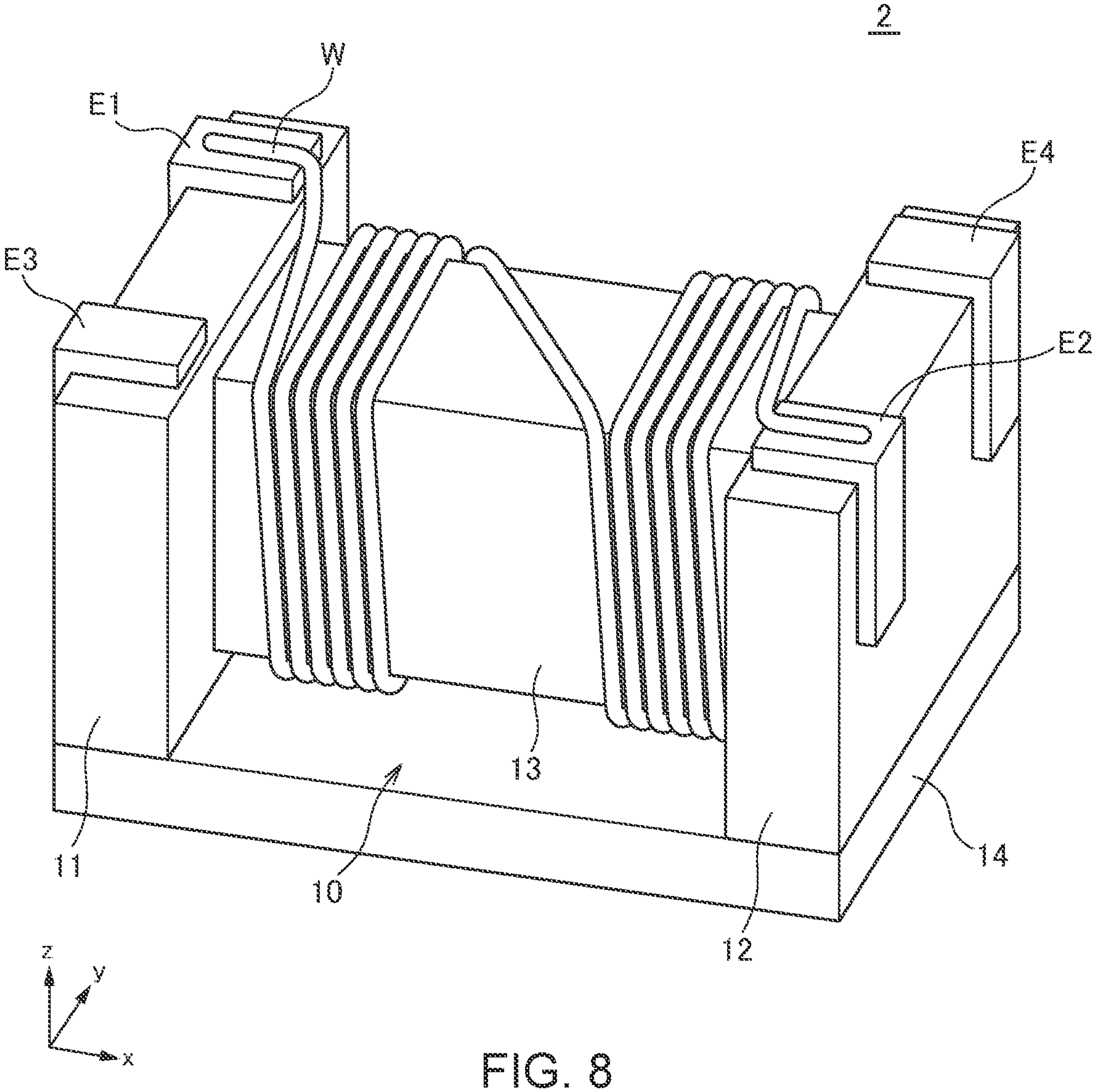
FIG. 8 is a schematic perspective view illustrating the outer appearance of a coil component 2 according to a modification.

FIG. 8 is a schematic perspective view illustrating the outer appearance of a coil component 2 according to a modification.

The coil component 2 according to the modification illustrated in FIG. 8 differs from the coil component 1 according to the above embodiment in that it additionally has a plate-like core 14. Other basic configurations are the same as those of the coil component 1 according to the above embodiment, so the same reference numerals are given to the same elements, and overlapping description will be omitted.

The plate-like core 14 is fixed to the flange parts 11 and 12 and functions as a magnetic path connecting the flange parts 11 and 12. As a material for the plate-like core 14, a high permeability magnetic material similar to that for the drum-shaped core 10 is preferably used. When the plate-like core 14 is thus additionally provided, a closed magnetic loop is formed by the drum-shaped core 10 and plate-like core 14, making it possible to increase inductance.

It is apparent that the present invention is not limited to the above embodiments, but may be modified and changed without departing from the scope and spirit of the invention.

What is claimed is:

1. A coil component comprising:

a core having a winding core part, a first flange part positioned at one axial end of the winding core part, and a second flange part positioned at other axial end of the winding core part;

a first terminal electrode provided on the first flange part;

a second terminal electrode provided on the second flange part; and a wire wound around the winding core part, the wire having i) a first end connected to the first terminal electrode ii) a second end connected to the second terminal electrode, and iii) first and second points positioned between the first end and the second end, wherein the winding core part includes a first winding area positioned on a side of the first flange part, a second winding area positioned on a side of the second flange part, and a third winding area positioned between the first and second winding areas, wherein a width of the third winding area in an axial direction is larger than a width of each of the first and second winding areas in the axial direction, wherein the wire includes i) a first section positioned between the first end and the first point and wound in a plurality of turns around the first winding area, ii) a second section positioned between the second end and the second point and wound in a plurality of turns around the second winding area, and iii) a third section positioned between the first point and the second point and wound in less than one turn around the third winding area, wherein the first section and the third section are contiguous, and the second section and the third section are contiguous, wherein the winding core part of the core has first, second, third, and fourth winding surfaces, a first corner part constituting a boundary between the first and second winding surfaces, a second corner part constituting a boundary between the second and third winding surfaces, a third corner part constituting a boundary between the third and fourth winding surfaces, and a fourth corner part constituting a boundary between the fourth and first winding surfaces, wherein the first and third winding surfaces are wider than the second and fourth winding surfaces, wherein the first and second points of the wire are positioned on the fourth and first corner parts, respectively, such that the third section of the wire is located on the first winding surface without being located on the second, third, and fourth winding surfaces, wherein a first shift amount of a winding position of the wire in the axial direction in each turn of the first and second sections is smaller than a second shift amount of a winding position of the wire in the axial direction per turn in the third section, wherein the first shift amount is constant in each of the first and second sections, wherein the first section of the wire is closest to the first end, thereby the wire does not include any turns between the first end and the first section, and wherein the second section of the wire is closest to the second end, thereby the wire does not include any turns between the second end and the second section.

2. The coil component as claimed in claim 1, wherein adjacent turns of the wire contact each other in each of the first and second sections.

3. The coil component as claimed in claim 1, wherein the winding core part further includes a first clearance area positioned between the first flange part and the first winding area and free from the wire and a second clearance area positioned between the second flange part and the second winding area and free from the wire, and wherein widths of the first and second clearance areas in the axial direction are different from each other.

4. The coil component as claimed in claim 3, wherein one of the first and second clearance areas has an axial width smaller than a diameter of the wire.

5. The coil component as claimed in claim 1, wherein the second shift amount of the winding position of the wire in the third section on the predetermined first winding surface is five times or more a diameter of the wire.

6. The coil component as claimed in claim 1, wherein a cross section of the winding core part perpendicular to the axial direction thereof has a plurality of first corner parts and a plurality of second corner parts, wherein an internal angle of each of the first corner parts is smaller than that of each of the second corner parts, and wherein both start and end points of the third section of the wire are positioned at the first corner parts.

7. The coil component as claimed in claim 1, wherein a number of turns of the first section is a same as that of the second section.

8. The coil component as claimed in claim 1, wherein the third winding area is greater in length in the axial direction than each of the first and second winding areas.

9. The coil component as claimed in claim 4, wherein another of the first and second clearance areas has an axial width greater than a diameter of the wire.

10. The coil component as claimed in claim 1, further comprising:

a first dummy electrode provided on the first flange part; and a second dummy electrode provided on the second flange part.

11. The coil component as claimed in claim 10, wherein the first terminal electrode and the second dummy electrode are aligned in the axial direction, and wherein the second terminal electrode and the first dummy electrode are aligned in the axial direction.

* * * * *